(12) United States Patent
Kim et al.

(10) Patent No.: US 11,881,974 B2
(45) Date of Patent: Jan. 23, 2024

(54) MODULATION METHOD, MODULATION APPARATUS USING THE SAME, DEMODULATION METHOD, AND DEMODULATION APPARATUS USING THE SAME

(71) Applicant: UIF (University Industry Foundation), Yonsei University, Seoul (KR)

(72) Inventors: Tae Wook Kim, Seoul (KR); Geun Haeng Lee, Seoul (KR)

(73) Assignee: UIF (UNIVERSITY INDUSTRY FOUNDATION), YONSEI UNIVERSITY, Seoul (KR)

(*) Notice: Subject to any disclaimer, the term of this patent is extended or adjusted under 35 U.S.C. 154(b) by 212 days.

(21) Appl. No.: 17/410,652

(22) Filed: Aug. 24, 2021

(65) Prior Publication Data

US 2022/0231893 A1    Jul. 21, 2022

(30) Foreign Application Priority Data

Jan. 20, 2021   (KR) .................. 10-2021-0007891

(51) Int. Cl.
*H04L 27/02*    (2006.01)
*H04L 7/00*    (2006.01)

(52) U.S. Cl.
CPC ............ *H04L 27/02* (2013.01); *H04L 7/0037* (2013.01)

(58) Field of Classification Search
CPC ....... H04L 27/02; H04L 7/0037; H04L 27/04; H04L 27/06; H04L 27/32; H04L 25/40; H04L 25/49; H04L 25/4902; H04B 2201/71636; H04B 1/69; H04B 1/7163; H04B 1/6908; H04B 1/71632;
(Continued)

(56) References Cited

U.S. PATENT DOCUMENTS 3,553,334 A * 1/1971 Freeman .................. G10H 1/40
84/668
5,459,749 A * 10/1995 Park ...................... H04L 27/362
332/149
(Continued)

FOREIGN PATENT DOCUMENTS

KR   10-1995-0007344 A    3/1995
KR      10-1202742 B1    11/2012
(Continued)

OTHER PUBLICATIONS

Korean Office Action for related KR Application No. 10-2021-0007891 dated Jan. 8, 2022 from Korean Intellectual Property Office.
(Continued)

*Primary Examiner* — James M Perez
(74) *Attorney, Agent, or Firm* — Paratus Law Group, PLLC (57) ABSTRACT

Disclosed is a modulation method for modulating n-bit data (n=p+q+r). The modulation method includes forming a time difference between a data impulse and a sync impulse to correspond to p-bit data, modulating the amplitude of the sync impulse to correspond to q-bit data and modulating the amplitude of the data impulse to correspond to r-bit data, and combining the sync impulse and the data impulse. As an example, n may be equal to p+q+r.

17 Claims, 9 Drawing Sheets

(58) Field of Classification Search
CPC ............ H04B 1/71635; H04B 1/71637; H04B 1/7176; H04B 1/7172; H04B 1/7174; H04B 1/7183
See application file for complete search history.

(56) References Cited

U.S. PATENT DOCUMENTS

| | | | | |
|---|---|---|---|---|
| 6,501,393 | B1* | 12/2002 | Richards | H04B 1/7163 340/991 |
| 6,763,057 | B1* | 7/2004 | Fullerton | H04L 25/4902 375/150 |
| 7,590,198 | B2* | 9/2009 | Sanada | H04B 1/7183 370/503 |
| 7,889,753 | B2* | 2/2011 | Ekbal | H04B 1/71632 370/431 |
| 8,014,425 | B2* | 9/2011 | Ekbal | H04B 1/71632 375/259 |
| 8,890,738 | B2* | 11/2014 | Kim | G04F 10/005 341/166 |
| 8,897,735 | B2* | 11/2014 | Kim | H04B 1/525 375/150 |
| 9,559,874 | B2* | 1/2017 | Han | H04L 25/03343 |
| 9,749,126 | B2* | 8/2017 | Kim | H03K 5/1502 |
| 10,212,009 | B2* | 2/2019 | Qu | H04L 27/04 |
| 10,327,213 | B1* | 6/2019 | Han | H04W 52/0206 |
| 10,693,529 | B1* | 6/2020 | Sissoev | H01Q 1/38 |
| 11,057,123 | B1* | 7/2021 | Chang | H04B 1/38 |
| 11,095,427 | B1* | 8/2021 | Banin | H03C 3/00 |
| 11,387,852 | B2* | 7/2022 | Banin | H04B 1/04 |
| 11,477,062 | B2* | 10/2022 | Bicais | H04L 27/06 |
| 2001/0033576 | A1* | 10/2001 | Richards | H04L 27/00 370/442 |
| 2001/0053175 | A1* | 12/2001 | Hoctor | H04L 25/4902 375/256 |
| 2001/0055353 | A1* | 12/2001 | Rybicki | H04B 10/114 375/353 |
| 2002/0018514 | A1* | 2/2002 | Haynes | H04B 1/7183 375/130 |
| 2002/0075972 | A1* | 6/2002 | Richards | H04L 25/4902 375/239 |
| 2003/0108133 | A1* | 6/2003 | Richards | H04B 1/69 375/351 |
| 2003/0198212 | A1* | 10/2003 | Hoctor | H04B 1/7183 370/503 |
| 2006/0083294 | A1* | 4/2006 | Orlik | H04L 27/2071 375/148 |
| 2007/0237065 | A1* | 10/2007 | Kim | H04B 1/71637 370/203 |
| 2007/0291834 | A1* | 12/2007 | Toumazou | H04B 1/7176 375/295 |
| 2008/0069183 | A1* | 3/2008 | Terada | H04B 1/71635 375/E1.032 |
| 2008/0205559 | A1* | 8/2008 | Iida | H04B 1/7174 375/343 |
| 2008/0247442 | A1* | 10/2008 | Orlik | H04L 1/006 375/138 |
| 2010/0315142 | A1* | 12/2010 | Zerbe | H04L 7/10 327/161 |
| 2010/0328043 | A1* | 12/2010 | Jantunen | G06K 7/0008 340/10.3 |
| 2011/0316731 | A1* | 12/2011 | Scheytt | H03K 7/08 341/143 |
| 2012/0069893 | A1* | 3/2012 | Shirakata | H04L 25/0262 375/239 |
| 2014/0292552 | A1* | 10/2014 | Kim | G04F 10/005 341/156 |
| 2015/0312078 | A1* | 10/2015 | Bogdan | H04L 27/2656 375/226 |
| 2016/0142097 | A1* | 5/2016 | Matic | H04B 17/364 375/130 |
| 2016/0191084 | A1* | 6/2016 | Kim | H04L 7/04 375/295 |
| 2016/0373164 | A1* | 12/2016 | Kawasaki | H04B 3/52 |
| 2020/0212943 | A1* | 7/2020 | Banin | H04L 1/1607 |
| 2021/0302559 | A1* | 9/2021 | Kim | G01S 13/346 |
| 2022/0231893 | A1* | 7/2022 | Kim | H04L 7/0037 |
| 2023/0170932 | A1* | 6/2023 | Kim | H04B 1/71632 375/130 |

FOREIGN PATENT DOCUMENTS

| | | |
|---|---|---|
| KR | 10-1621853 B1 | 5/2016 |
| KR | 10-2018-0081859 A | 7/2018 |
| KR | 10-2168362 B1 | 10/2020 |

OTHER PUBLICATIONS

Geunhaeng Lee et al., "An IR-UWB CMOS Transceiver for High-Data-Rate, Low-Power, and Short-Range Communication", IEEE Journal of Solid-State Circuits, Aug. 2019, pp. 2163-2174, vol. 54, No. 8.

* cited by examiner

MODULATION METHOD, MODULATION APPARATUS USING THE SAME, DEMODULATION METHOD, AND DEMODULATION APPARATUS USING THE SAME

CROSS-REFERENCE TO RELATED APPLICATION

This application claims priority to and the benefit of Korean Patent Application No. 10-2021-0007891, filed on Jan. 20, 2021, the disclosure of which is incorporated herein by reference in its entirety.

BACKGROUND

1. Field of the Invention

The present disclosure relates to a modulation method, a demodulation method, and a modulation apparatus and a demodulation apparatus using the same.

2. Discussion of Related Art

Ultra-wideband (UWB) technology, which is one of the wireless communication technologies, is attracting attention. UWB exhibits advantages with respect to high-speed wireless communication, low power, and efficient frequency utilization. Additionally, UWB technology is also attracting attention in the industry because it suggests the possibility of using short-range high-speed wireless communication in everyday life.

UWB technology uses very short pulses of less than 1 ns for communication. In order to transmit information using pulses, a basic pulse should be modulated.

As a UWB technology-based modulation scheme, there is an on-off keying scheme in which an impulse signal is transmitted or not transmitted within a given time interval. The on-off keying scheme is a communication scheme that transmits a synchronization pulse and recognizes "1" if an impulse signal is sent after the synchronization pulse and recognizes "0" otherwise. This communication scheme does not have a high data rate. That is, the on-off keying scheme has a data rate of about a pulse repetition frequency (PRF), which is a period in which a UWB signal is transmitted.

Meanwhile, UWB technology is restricted so that transmission power spectrum density does not exceed −41.3 dBm/MHz at a frequency of 3.1 to 10.6 GHz according to the regulations of the Federal Communications Commission (FCC).

SUMMARY

The above-described on-off keying modulation scheme and demodulation scheme have a low data rate, so data transmission efficiency is low. One of the objects to be achieved by the present technology is to obtain high data transmission efficiency in the UWB technology using impulses in order to solve the disadvantages of the related art.

According to an aspect of the present disclosure, there is provided a modulation method for modulating n-bit data (e.g., n may be equal to p+q+r), the modulation method comprising: forming a time difference between a data impulse and a sync impulse to correspond to p-bit data, modulating the amplitude of the sync impulse to correspond to q-bit data and modulating the amplitude of the data impulse to correspond to r-bit data, and combining the sync impulse and the data impulse.

The forming of a time difference may include receiving a clock signal and delaying the clock signal to correspond to the p-bit data to form a data edge, forming a sync window corresponding to an edge of the clock signal and a data window corresponding to the data edge, and forming the sync impulse corresponding to the sync window and the data impulse corresponding to the data window.

The modulating of the amplitude of the sync impulse to correspond to q-bit data may include receiving the sync window; decoding the q-bit data to provide the decoded q-bit data to a push-pull stage; and forming, by the push-pull stage using current corresponding to the decoding result, a sync impulse with an amplitude corresponding to the q-bit data.

The modulating of the amplitude of the data impulse to correspond to r-bit data may include receiving the data window, decoding the r-bit data to provide the decoded r-bit data to the push-pull stage, and forming, by the push-pull stage using current corresponding to the decoding result, a data impulse with an amplitude corresponding to the r-bit data.

According to an aspect of the present disclosure, there is provided a demodulation method including down-converting a radio frequency (RF) signal to baseband and outputting envelope signals of a pulse, demodulating a time difference between the envelope signals; and demodulating the amplitude of the envelope signals.

The down-converting of an RF signal to baseband may be performed by an envelope detector.

The demodulating of a time difference may include comparing the envelope signals to a threshold voltage to form pulses corresponding to the envelope signals, detecting edges of the pulses, and forming digital code corresponding to a time difference between the detected edges of the pulses.

The demodulating of a time difference may be performed at a sampling rate higher than a sampling rate at which the time difference is modulated.

The demodulating of the amplitude may include detecting a peak of the envelope signals and forming digital code corresponding to the detected peak.

The demodulating of the amplitude may be performed using an analog-to-digital converter with a bit resolution higher than a bit resolution of a digital-to-analog converter for modulating the amplitude.

According to an aspect of the present disclosure, there is provided a modulation apparatus for modulating n-bit data (e.g., n may be equal to p+q+r), the modulation apparatus including a time difference modulation unit configured to form a time difference between a sync impulse and a data impulse to correspond to p-bit data, an impulse amplitude modulation unit configured to modulate the amplitude of the sync impulse to correspond to q-bit data and modulate the amplitude of the data impulse to correspond to r-bit data, and a matching unit configured to combine the modulated sync impulse and the modulated data impulse.

The time difference modulation unit may include a digital-to-time converter (DCT) configured to receive a clock signal and delay the clock signal to correspond to the p-bit data to form a data edge corresponding to the data impulse and a window generator configured to receive the data edge, form a data impulse window corresponding to the data edge, and form a sync impulse window corresponding to a reference edge of the clock signal.

The impulse amplitude modulation unit may include a sync impulse generator including a push-pull stage configured to receive the sync impulse window and form a sync impulse with an amplitude corresponding to the q-bit data from the sync impulse window and a data impulse generator including a push-pull stage configured to receive the data impulse window and form a data impulse with an amplitude corresponding to the r-bit data from the data impulse window.

The sync impulse generator and the data impulse generator may further include a decoder configured to decode provided digital data and output the digital data to the push-pull stage, and the push-pull stage may control the amplitude of the impulse using current corresponding to the decoded data.

According to an aspect of the present disclosure, there is provided a demodulation apparatus including an analog front end configured to down-convert a radio frequency (RF) signal to baseband and output envelope signals, a time difference demodulation path configured to demodulate a time difference between the envelope signals and output data, and an amplitude demodulation path configured to demodulate the amplitude of the envelope signals and output data.

The analog front end may include an envelope detector configured to down-convert an RF signal to baseband and detect an envelope of the down-converted signal.

The time difference demodulation path may include a comparator configured to compare the envelope signals to a threshold voltage to form pulses corresponding to the envelope signals, an edge detector configured to detect edges of the pulses, and a time-to-digital converter (TDC) configured to form digital code corresponding to a time difference between the detected edges of the pulses.

The time difference demodulation path may demodulate the time difference at a sampling rate higher than a sampling rate at which the time difference is modulated.

The amplitude demodulation path may include a peak detector configured to detect a peak of the envelope signals and an analog-to-digital converter (ADC) configured to form digital code corresponding to the detected peak.

The amplitude demodulation path may be performed using an ADC with a bit resolution higher than a bit resolution of a digital-to-analog converter for modulating the amplitude.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
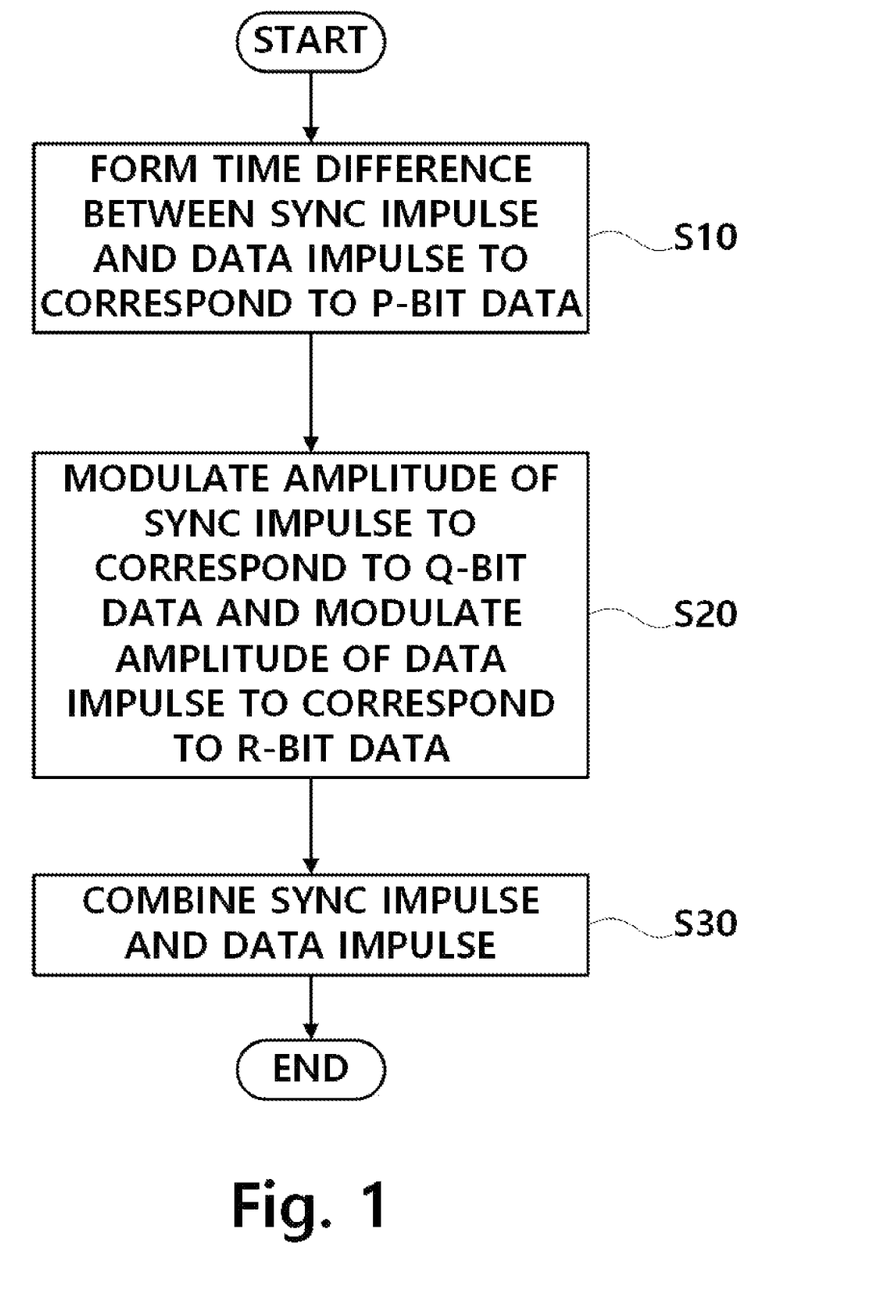
FIG. 1 is a flowchart illustrating a modulation method according to an embodiment.

A modulation method and a modulation apparatus 1 according to an embodiment will be described below with reference to FIGS. 1 to 3. FIG. 1 is a flowchart illustrating a modulation method according to an embodiment. Referring to FIG. 1, the modulation method according to an embodiment, which is a modulation method for modulating n-bit data, includes forming a time difference between a data impulse and a sync impulse to correspond to p-bit data (S10), modulating the amplitude of the sync impulse to correspond to q-bit data and modulating the amplitude of the data impulse to correspond to r-bit data (S20), and combining the sync impulse and the data impulse (S30). As an example, n may be equal to p+q+r.

Figure 2:
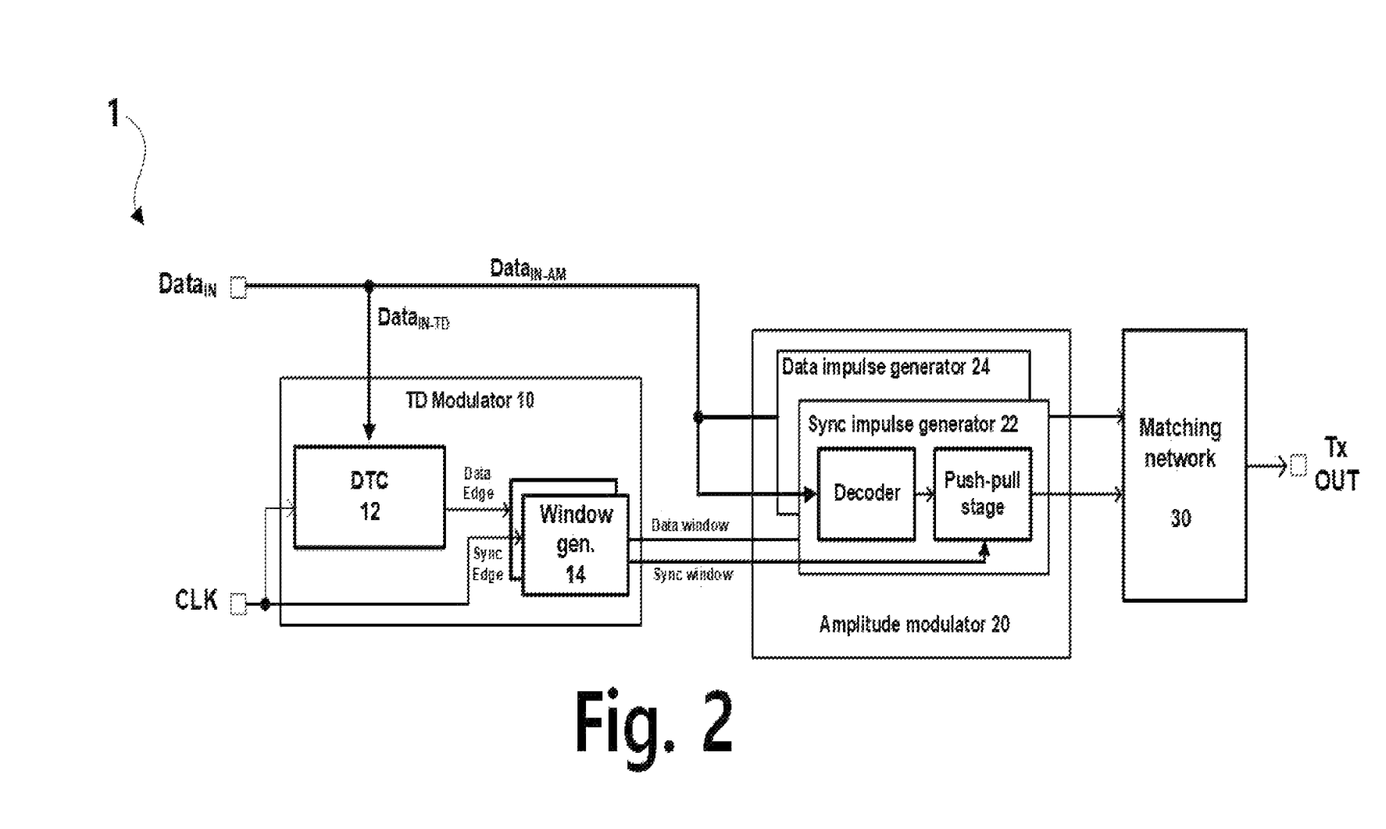
FIG. 2 is a diagram schematically illustrating a modulation apparatus 1 according to an embodiment.

FIG. 2 is a diagram schematically showing the modulation apparatus 1 according to an embodiment. Referring to FIG. 2, the modulation apparatus includes a time difference (TD) modulator 10 configured to form a time difference between a sync impulse and a data impulse to correspond to p-bit data, an impulse amplitude modulator 20 configured to modulate the amplitude of the sync impulse to correspond to q-bit data and modulate the amplitude of the data impulse to corresponding to the r-bit data, and a matching network 30 configured to combine the modulated sync impulse and the modulated data impulse.

Figure 3:
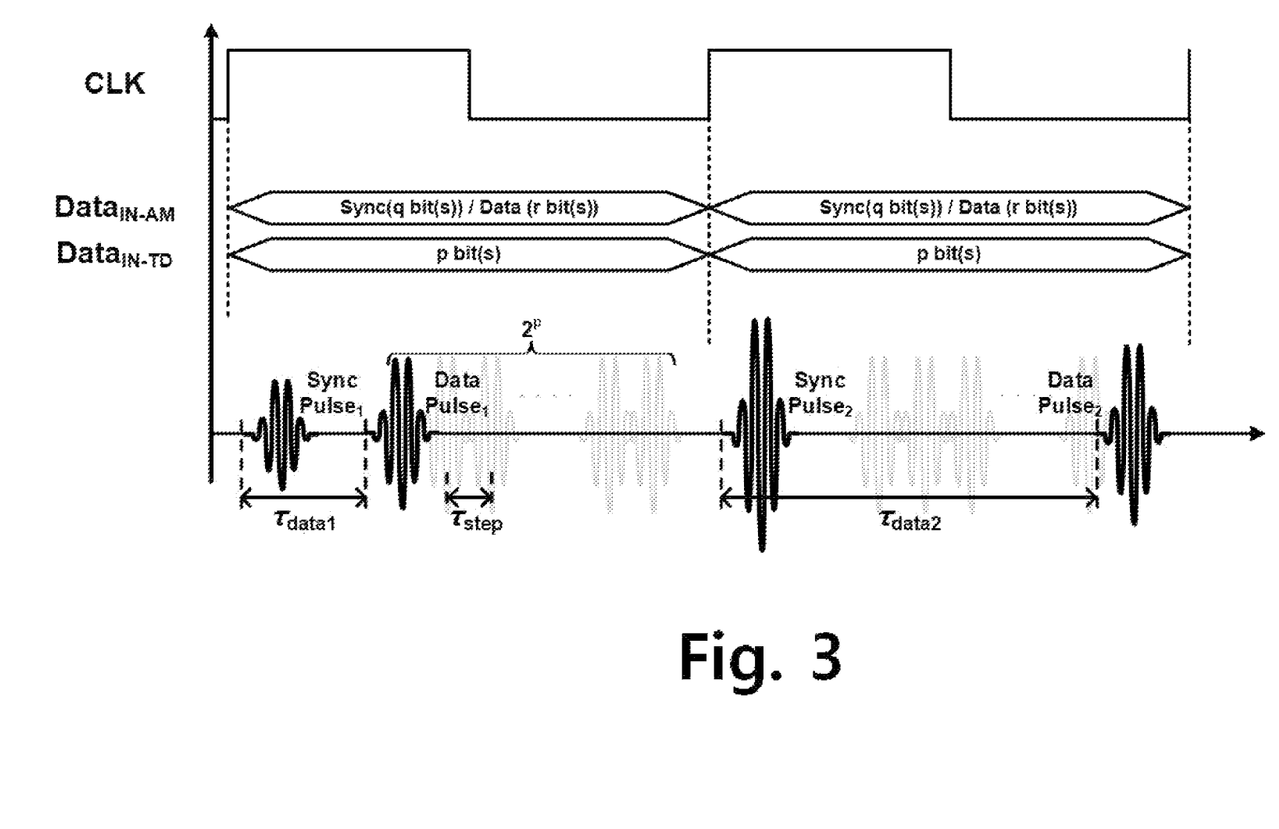
FIG. 3 is a timing diagram illustrating operation of the modulation apparatus 1 and the modulation method according to an embodiment.

FIG. 3 is a timing diagram illustrating operation of the modulation apparatus 1 and the modulation method according to an embodiment. Referring to FIGS. 1 to 3, data DataIN is provided to the modulation apparatus 1. Data DataIN includes p-bit data to be modulated with time difference (DataIN-TD) and data to be modulated to have the amplitude of impulses (DataIN-AM). As an example, DataIN-AM, which is the data to be modulated to have the amplitude of impulses, may include n-bit data including q-bit data to be modulated to have the amplitude of the sync impulse and r-bit data to be modulated to have the amplitude of the data impulse.

A clock signal CLK and p-bit data DataIN-TD to be modulated with time difference are provided to a digital-to-time converter (DTC) 12. The DTC 12 delays a reference edge of the clock signal CLK by a time corresponding to the p-bit data DataIN-TD to form a data edge and outputs the data edge to a window generator 14 (S10). In the shown embodiment, the reference edge of the clock signal CLK is a rising edge.

The data edge is provided to the window generator 14 to form a data window. The clock signal CLK is provided to the window generator 14, and the reference edge of the clock signal CLK functions as a sync edge forming a sync window.

The window generator 14 delays the data edge by a delay time preset with at least one delay cell and combines a plurality of edges corresponding to the delayed edge to form a data window. The formed data window may be formed by combining a plurality of rising edges and falling edges. The window generator 14 receives the sync edge and, in this way, forms and outputs the sync window.

The sync window is provided to a sync impulse generator 22, and the data window is provided to a data impulse generator 24. In an embodiment, the sync impulse generator 22 and the data impulse generator 24 include a decoder that is provided with q-bit data and a decoder that is provided with r-bit data, respectively. A decoding result of the decoder is output to a push-pull stage, and a bias current of the push-pull stage is controlled. The push-pull stage included in the sync impulse generator 22 receives the sync window and forms a sync impulse signal with an amplitude corresponding to the magnitude of bias current. Likewise, the push-pull stage included in the data impulse generator 24 receives the data window and then forms and outputs a data impulse with an amplitude corresponding to the magnitude of bias current.

Accordingly, the sync impulse generator 22 receives the q-bit data and the sync window and outputs the sync pulse with the amplitude corresponding to the q-bit data, and the data impulse generator 24 receives the r-bit data and the data window and outputs the data impulse with the amplitude corresponding to the r-bit data. The sync impulse and the data impulse output by the sync impulse generator 22 are combined (S30) and output by the matching network 30.

Referring to FIG. 3, the p-bit data DataIN-TD to be modulated with time difference in a first period of the clock signal CLK is modulated with τdata1, which is a time difference between a sync impulse Sync pulse1 and a data impulse Data pulse1, and the p-bit data DataIN-TD to be modulated with time difference in a second period of the clock signal is modulated with τdata2, which is a time difference between a sync impulse Sync pulse1 and a second impulse Data pulse1. That is, a sync impulse Sync pulse formed by the sync window and a data impulse Data pulse formed by the data window has a time difference corresponding to the p-bit data DataIN-TD.

According to the modulation method according to an embodiment, the time difference between the sync impulse and the data impulse may be divided into $2^p$ (here, p is the number of bits of data DataIN-TD to be modulated with time difference) sections (τstep).

Also, the amplitude of the sync impulse Sync pulse1 and the amplitude of the data impulse Data pulse2 in the first period of the clock signal CLK are modulated to correspond to q-bit data and r-bit data included in the data DataIN-TD to be modulated with amplitude. Subsequently, the amplitude of the sync impulse Sync pulse1 and the amplitude of the data impulse Data pulse2 in the next period of the clock signal CLK are modulated to correspond to q-bit data and r-bit data included in the data DataIN-TD to be modulated with amplitude.

According to the modulation method according to an embodiment, the p-bit data included in the input data DataIN is modulated with a time difference between the sync impulse and the data impulse, and the q-bit data and the r-bit data included in the input data DataIN are modulated with the amplitude of the sync impulse and the amplitude of the data impulse, respectively. Therefore, advantageously, it is possible to transmit data at a high data rate.

Figure 4:
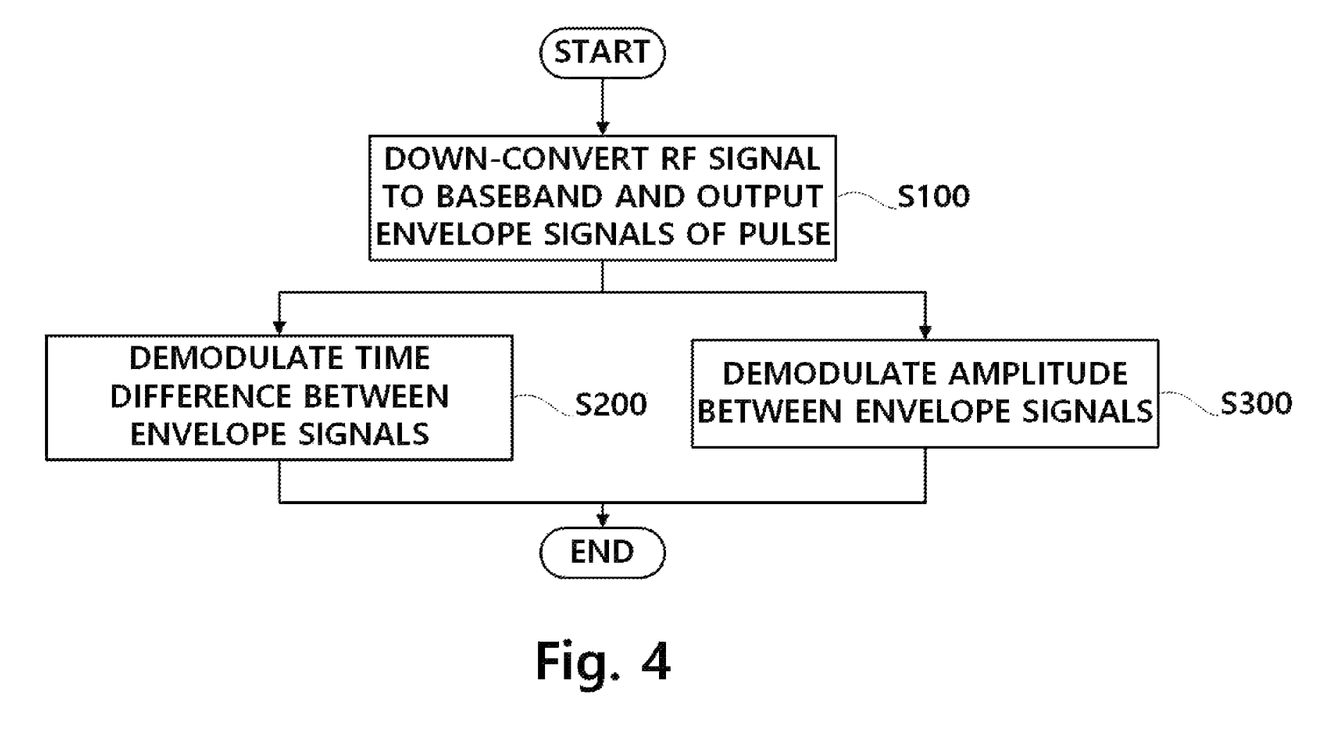
FIG. 4 is a flowchart illustrating a demodulation method according to an embodiment.

A demodulation method according to an embodiment will be described below with reference to FIGS. 4 to 6. FIG. 4 is a flowchart illustrating the demodulation method according to an embodiment. Referring to FIG. 4, the demodulation method according to an embodiment includes down-converting a radio frequency (RF) signal to baseband and outputting envelope signals of a pulse (S100), demodulating a time difference between the envelope signals (S200), and demodulating the amplitude of the envelope signals (S300).

Figure 5:
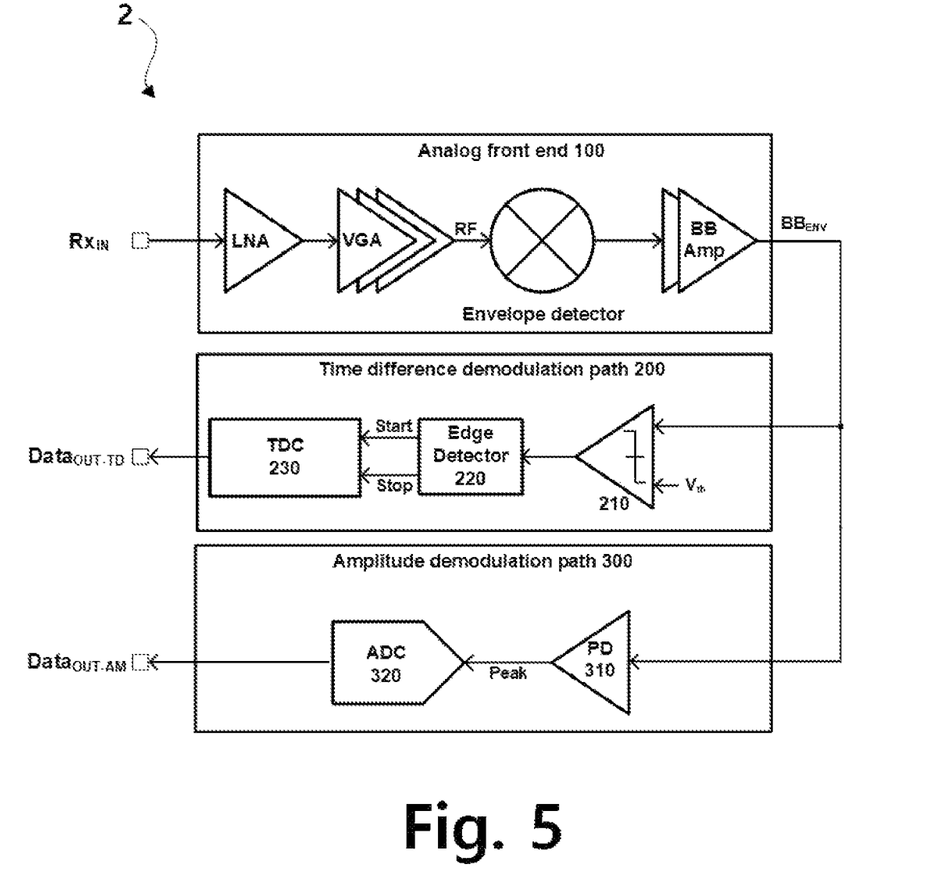
FIG. 5 is a diagram illustrating a demodulation apparatus 2 according to an embodiment.

FIG. 5 is a diagram illustrating a demodulation apparatus 2 according to an embodiment. Referring to FIG. 5, the demodulation apparatus 2 according to an embodiment includes an analog front end 100 configured to down-convert an RF signal to baseband and output envelope signals of a pulse, a time difference demodulation path 200 configured to demodulate a time difference between the envelope signals, and an amplitude demodulation path 300 configured to demodulate the amplitude of the envelope signals and output data.

Figure 6:
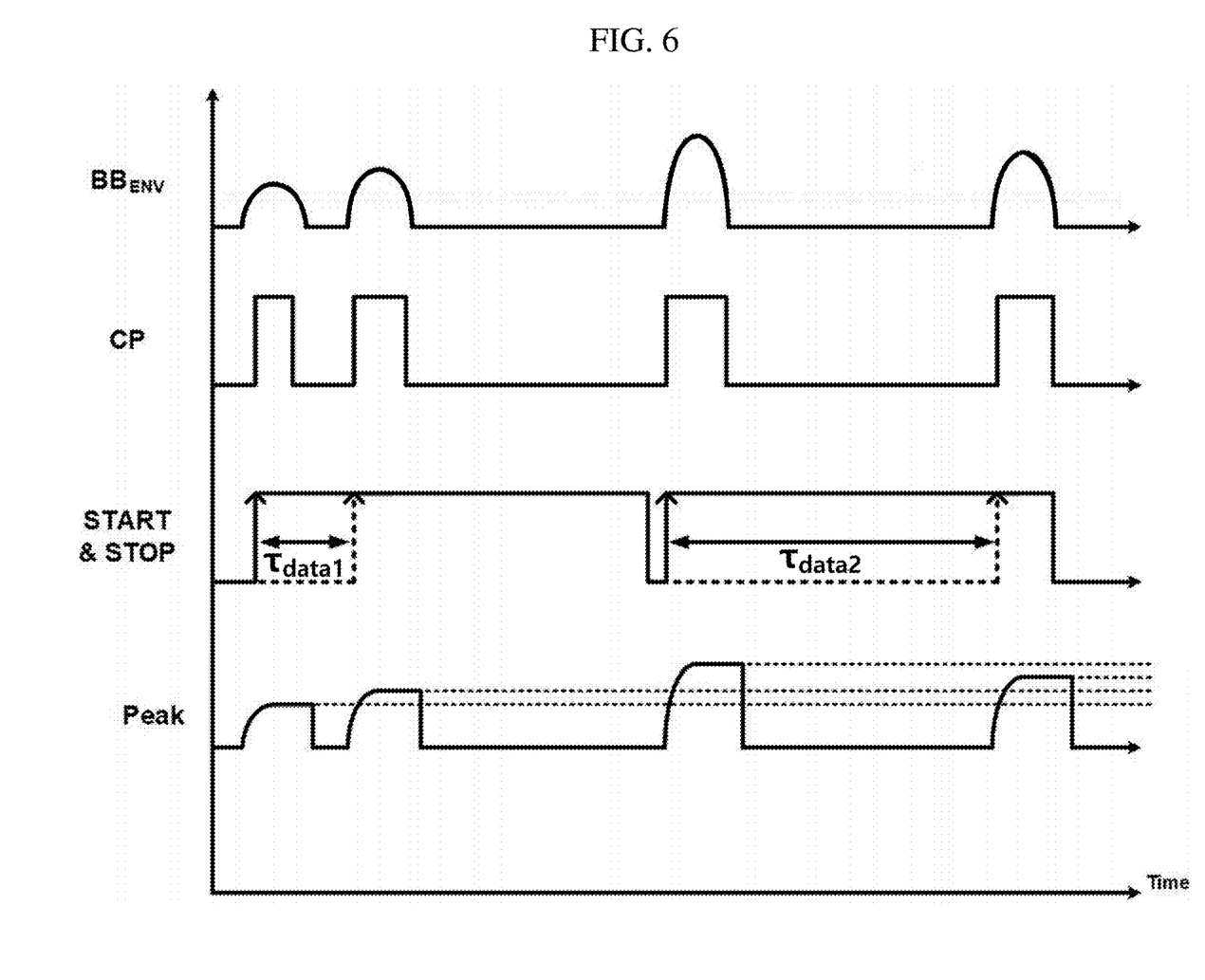
FIG. 6 is a schematic timing diagram illustrating the demodulation apparatus 2 and the demodulation method according to an embodiment.

FIG. 6 is a schematic timing diagram illustrating the demodulation apparatus 2 and the demodulation method according to an embodiment. Referring to FIGS. 4 to 6, an RF signal RxIN received from an antenna (not shown) is provided to the analog front end 100. The RF signal RxIN may be a signal obtained by transmission data modulated to have the time difference between two impulses and the amplitude of two impulses according to the modulation method according to an embodiment.

The analog front end 100 amplifies the RF signal RxIN with a low noise amplifier (LNA) and a variable gain amplifier (VGA) and outputs the amplified RF signal to an envelope detector. In an embodiment, the envelope detector performs self mixing to down-convert a provided RF signal to baseband, detects an envelope of the down-converted signal BB, and provides the envelope to a baseband amplifier (BB amp). The BB amp amplifies an envelope signal by a predetermined gain and outputs the envelope signal to the time difference demodulation path 200 and the amplitude demodulation path 300 (S100).

As shown in FIG. 6, an envelope signal $BB_{ENV}$ output from the envelope detector corresponds to an envelope of a signal including a sync impulse and a data impulse formed by modulating data provided by the modulation apparatus 1 according to an embodiment (See FIG. 3).

The envelope signal $BB_{ENV}$ is provided to a comparator 210 of the time difference demodulation path 200. The comparator 210 compares the magnitude of the envelope signal $BB_{ENV}$ and the magnitude of a threshold voltage Vth and outputs the comparison result as a pulse signal CP. In the shown embodiment, the comparator 210 outputs a logic high state when the magnitude of the envelope signal $BB_{ENV}$ is greater than the threshold voltage Vth and outputs a logic low state when the magnitude of the envelope signal $BB_{ENV}$ is less than the threshold voltage. Therefore, the pulse signal CP output by the comparator 210 corresponds to the envelope signal BBENV.

The pulse signal CP output by the comparator 210 is provided to an edge detector 220, and the edge detector 220 outputs a start signal Start and a stop signal Stop corresponding to a time difference of a provided pulse signal. In an embodiment not shown, the edge detector 220 detects a rising edge of a first pulse signal to output a start signal Start and detects a rising edge of a subsequent pulse signal to output a start signal Start. In the shown embodiment, the edge detector 220 may detect a falling edge of a first pulse signal to output a start signal Start and may detect a falling edge of a subsequent pulse signal to output a start signal Start.

A time digital converter (TDC) 230 detects a time difference between the start signal Start and the stop signal Stop output by the edge detector 220 and outputs digital code DataOUT-TD corresponding to the time difference. As illustrated in FIG. 6, it can be seen that a time difference τdata1 between a first start signal Start and a first stop signal Stop corresponds to a time difference τdata1 between a sync impulse Sync pulse1 and a data impulse Data pulse1 which are modulated with time difference in the first period of the clock signal CLK. Also, it can be seen that a time difference τdata2 between a second start signal Start and a second stop signal Stop corresponds to a time difference τdata2 between a sync impulse Sync pulse2 and a data impulse Data pulse2 which are modulated with time difference in the next period of the clock signal CLK. Therefore, the time difference demodulation path 200 may demodulate p-bit digital code DataOUT-TD modulated with time difference between the sync impulse and the data impulse.

In an embodiment, in order to improve demodulation accuracy, the TDC 230 may oversample the time difference between the start signal Start and the stop signal Stop at a sampling rate higher than the sampling rate of the DTC 12 (see FIG. 2). Thus, it is possible to reduce influence caused by a delay due to a path difference between impulse signals.

The envelope signal $BB_{ENV}$ is provided to a peak detector (PD) 310 of the amplitude demodulation path 300. Also, the envelope signal $BB_{ENV}$ is provided to the comparator 210. The peak detector 310 detects a peak value of the provided envelope signal $BB_{ENV}$ and outputs the detected peak value as a peak signal peak having a corresponding magnitude. It can be seen that the peak signal peak increases as the envelope signal $BB_{ENV}$ provided to the peak detector 310 increases, and it can also be seen that the peak signal remains maximized even when the magnitude of the envelope signal $BB_{ENV}$ decreases.

The peak signal formed in this way is provided to an analog-to-digital converter (ADC) 320 and demodulated with digital code DataOUT-AM corresponding to the magnitude of the corresponding peak signal peak. In an illustrated embodiment, a first peak signal corresponds to the amplitude of a first sync impulse, and a subsequent peak signal corresponds to the amplitude of a data impulse following the first sync impulse. The ADC 320 may detect, for example, the magnitude of the peak signal with a resolution corresponding to a resolution for amplitude modulation and may demodulate amplitude-modulated data from the magnitude of the peak signal. Therefore, it is possible to demodulate q-bit data modulated to have the magnitude of the first sync impulse and r-bit data modulated to have the magnitude of the data impulse (S300).

In the shown embodiment, when the magnitude of the sync impulse and the magnitude of the data impulse are modulated to be 2-bit data, data obtained by modulating the magnitude of the sync impulse and data obtained by modulating the magnitude of the data impulse may be demodulated using the ADC 320 having 2-bit resolution (i.e., four thresholds), as illustrated in FIG. 6.

In an embodiment not shown, the ADC may detect a peak with a resolution higher than a resolution at which the magnitude of the sync impulse and the magnitude of the data impulse are modulated. By modulating amplitude using a high-resolution ADC in order to overcome a change in the magnitude of the sync impulse and the data impulse due to non-ideal characteristics, it is possible to demodulate data with high accuracy.

In the demodulation apparatus 2 described above, a signal path has been described using a single-ended signal as an example. However, a differential signaling transfer scheme may be used so as to improve noise immunity.

With the modulation method, the demodulation method, the modulation apparatus, and the demodulation apparatus according to an embodiment, it is advantageously possible to perform data communication at a high data transmission rate in a conventional UWB communication scheme.

SIMULATION EXAMPLE

Figure 7:
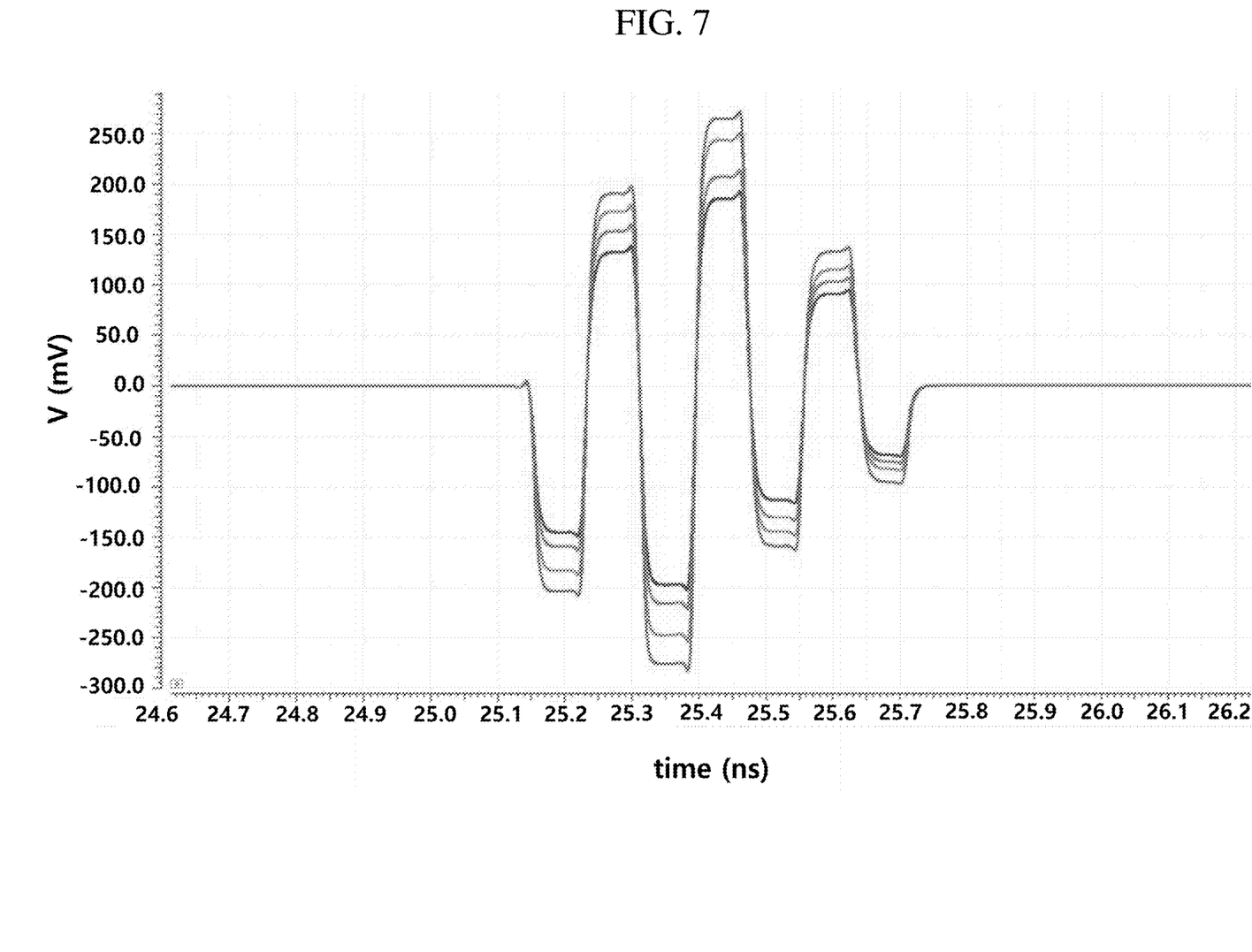
FIG. 7 is a diagram showing an amplitude-modulated impulse formed according to the modulation method according to an embodiment.

A simulation example of an embodiment will be described below with reference to FIGS. 7 to 9. FIG. 7 is a diagram showing an amplitude-modulated impulse formed according to the modulation method according to an embodiment. Referring to FIG. 7, 2-bit data and an impulse window are input to a push-pull stage included in the amplitude modulator. The push-pull stage may form an impulse according to an impulse window and may modulate the amplitude of the impulse to correspond to the two-bit data as shown.

Figure 8:
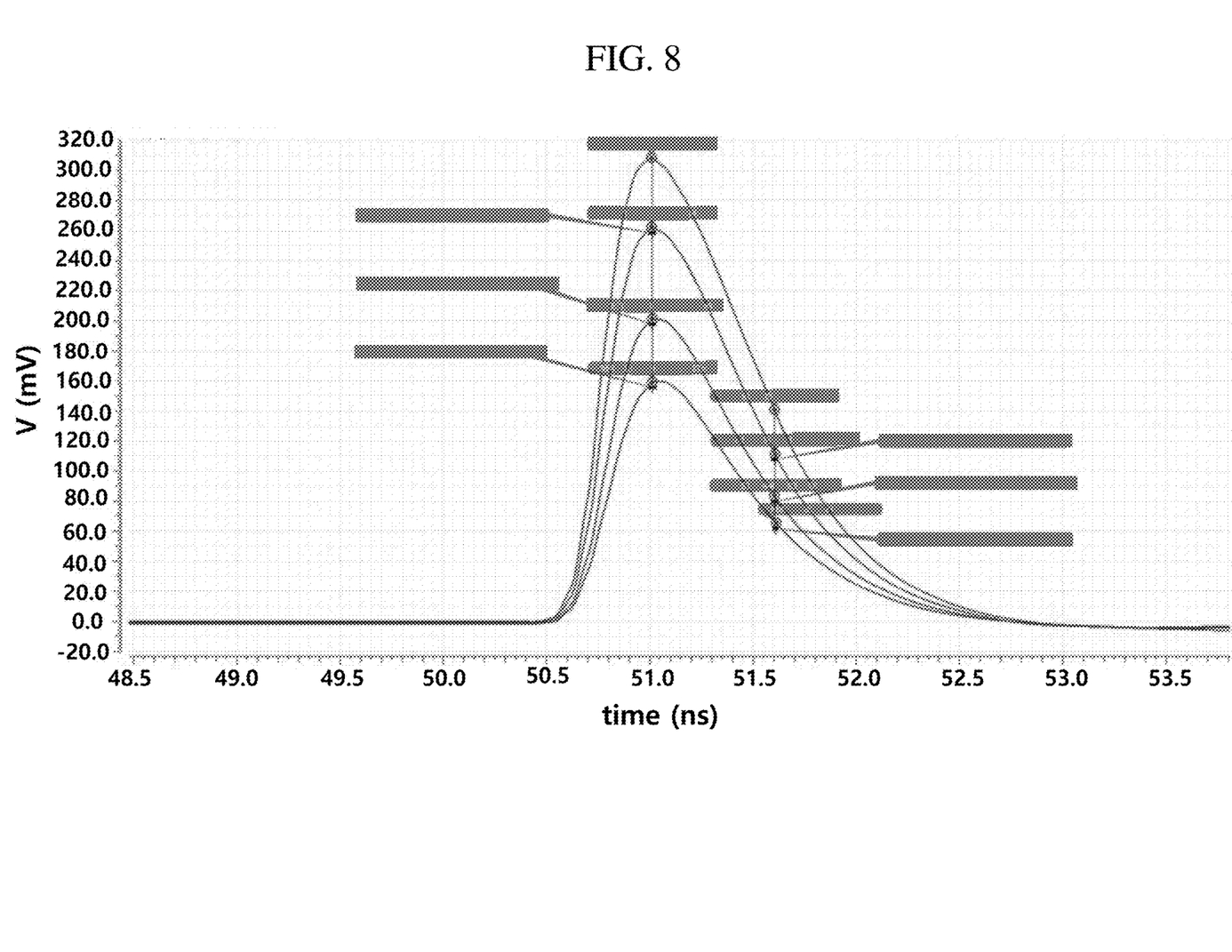
FIG. 8 is a diagram illustrating an example of an envelope signal that an envelope detector detects from an impulse signal illustrated in FIG. 7.

FIG. 8 is a diagram illustrating an example of an envelope signal that an envelope detector detects from an impulse signal illustrated in FIG. 7. Referring to FIG. 8, it can be seen that an envelope signal is formed to correspond to the magnitude of an amplitude-modulated impulse signal according to 2-bit data.

Figure 9:
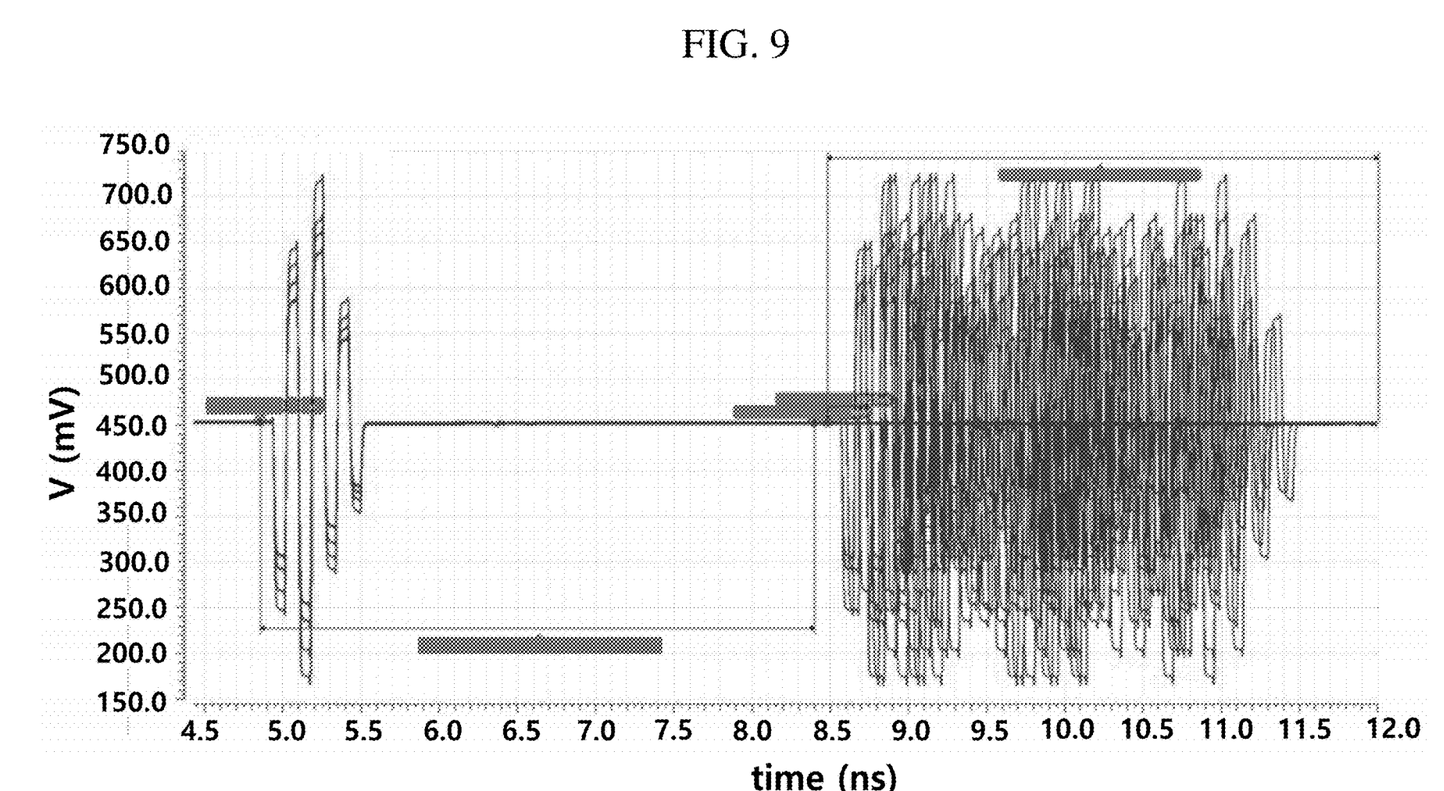
FIG. 9 is a diagram showing that time-difference-modulated and amplitude-modulated impulse signals are superimposed on each other according to arbitrary data.

FIG. 9 is a diagram showing that impulse signals modulated with time difference and modulated with amplitude according to arbitrary data are superimposed on each other. Referring to FIG. 9, it can be seen that the amplitude of a sync impulse is modulated by data, and it can also be seen that the time difference between a sync impulse and a data impulse is modulated by data.

According to an embodiment, it is advantageously possible to obtain a high data rate in UWB communication using an impulse signal.

The above description has been provided with reference to the embodiments shown in the accompanying drawings in order to help understand the present invention, but the embodiments are merely illustrative for implementation. Accordingly, it will be understood by those skilled in the art that various modifications and equivalents are possible. Therefore, the technical scope of the present invention should be defined by the appended claims.

What is claimed is:

1. A modulation method for modulating n-bit data, the modulation method comprising:
    forming a time difference between a sync impulse and a data impulse to correspond to p-bit data;
    modulating the amplitude of the sync impulse to correspond to q-bit data and modulating the amplitude of the data impulse to correspond to r-bit data; and
    combining the sync impulse and the data impulse,
    wherein the forming of a time difference comprises:
    receiving a clock signal and delaying the clock signal to correspond to the p-bit data to form a data edge;
    forming a sync window corresponding to an edge of the clock signal and a data window corresponding to the data edge; and
    forming the sync impulse corresponding to the sync window and the data impulse corresponding to the data window.

2. The modulation method of claim 1, wherein the modulating of the amplitude of the sync impulse to correspond to q-bit data comprises:
    receiving the sync window;
    decoding the q-bit data to provide the decoded q-bit data to a push-pull stage; and
    forming, by the push-pull stage using current corresponding to the decoding result, a sync impulse with an amplitude corresponding to the q-bit data.

3. The modulation method of claim 2, wherein the modulating of the amplitude of the data impulse to correspond to r-bit data comprises:
   receiving the data window;
   decoding the r-bit data to provide the decoded r-bit data to the push-pull stage; and
   forming, by the push-pull stage using current corresponding to the decoding result, a data impulse with an amplitude corresponding to the r-bit data.

4. A demodulation method comprising:
   down-converting an RF signal to baseband and outputting envelope signals of a pulse;
   demodulating a time difference between the envelope signals; and
   demodulating the amplitude of the envelope signals,
   wherein the demodulating of a time difference comprises:
      comparing the envelope signals to a threshold voltage to form pulses corresponding to the envelope signals;
      detecting edges of the pulses; and
      performing time-to-digital conversion for forming digital code corresponding to a time difference between the detected edges of the pulses.

5. The demodulation method of claim 4, wherein the down-converting of an RF signal to baseband is performed by an envelope detector.

6. The demodulation method of claim 4, wherein the demodulating of a time difference is performed at a sampling rate higher than a sampling rate at which the time difference is modulated.

7. The demodulation method of claim 4, wherein the demodulating of the amplitude comprises:
   detecting a peak of the envelope signals; and
   forming digital code corresponding to the detected peak.

8. The demodulation method of claim 4, wherein the demodulating of the amplitude is performed using an analog-to-digital converter with a bit resolution higher than a bit resolution of a digital-to-analog converter for modulating the amplitude.

9. The demodulation method of claim 4, wherein the demodulating of a time difference between the envelope signals and the demodulating of the amplitude of the envelope signals are performed at the same time.

10. A modulation apparatus for modulating n-bit data (n is p+q+r), the modulation apparatus comprising:
    a time difference modulation unit configured to form a time difference between a sync impulse and a data impulse to correspond to p-bit data;
    an impulse amplitude modulation unit configured to modulate the amplitude of the sync impulse to correspond to q-bit data and modulate the amplitude of the data impulse to correspond to r-bit data; and
    a matching unit configured to combine the modulated sync impulse and the modulated data impulse,
    wherein the time difference modulation unit comprises:
    a digital-to-time converter (DTC) configured to receive a clock signal and delay the clock signal to correspond to the p-bit data to form a data edge corresponding to the data impulse; and
    a window generator configured to receive the data edge, form a data impulse window corresponding to the data edge, and form a sync impulse window corresponding to a reference edge of the clock signal.

11. The modulation apparatus of claim 10, wherein the impulse amplitude modulation unit comprises:
    a sync impulse generator comprising a push-pull stage configured to receive the sync impulse window and form a sync impulse with an amplitude corresponding to the q-bit data from the sync impulse window; and
    a data impulse generator comprising a push-pull stage configured to receive the data impulse window and form a data impulse with an amplitude corresponding to the r-bit data from the data impulse window.

12. The modulation apparatus of claim 11, wherein
    the sync impulse generator and the data impulse generator further comprise a decoder configured to decode provided digital data and output the digital data to the push-pull stage, and
    the push-pull stage controls the amplitude of the impulse using current corresponding to the decoded data.

13. A demodulation apparatus comprising:
    an analog front end configured to down-convert a radio frequency (RF) signal to baseband and output envelope signals;
    a time difference demodulation path configured to demodulate a time difference between the envelope signals and output data; and
    an amplitude demodulation path configured to demodulate the amplitude of the envelope signals and output data,
    wherein the time difference demodulation path comprises:
       a comparator configured to compare the envelope signals to a threshold voltage to form pulses corresponding to the envelope signals;
       an edge detector configured to detect edges of the pulses; and
       a time-to-digital converter (TDC) configured to form digital code corresponding to a time difference between the detected edges of the pulses.

14. The demodulation apparatus of claim 13, wherein the analog front end comprises an envelope detector configured to down-convert an RF signal to baseband and detect an envelope of the down-converted signal.

15. The demodulation apparatus of claim 13, wherein the time difference demodulation path demodulates the time difference at a sampling rate higher than a sampling rate at which the time difference is modulated.

16. The demodulation apparatus of claim 13, wherein the amplitude demodulation path comprises:
    a peak detector configured to detect a peak of the envelope signals; and
    an analog-to-digital converter (ADC) configured to form digital code corresponding to the detected peak.

17. The demodulation apparatus of claim 13, wherein the amplitude demodulation path is performed using an ADC with a bit resolution higher than a bit resolution of a digital-to-analog converter for modulating the amplitude.

* * * * *